(12) United States Patent
Wheitner et al.

(10) Patent No.: US 10,962,350 B2
(45) Date of Patent: Mar. 30, 2021

(54) SYSTEMS AND METHODS FOR MEASUREMENT OF PISTON-TO-PISTON CLEARANCES IN MULTI-CYLINDER OPPOSED PISTON ENGINES

(71) Applicant: Cummins Inc., Columbus, IN (US)

(72) Inventors: Jeffrey A. Wheitner, Columbus, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 151 days.

(21) Appl. No.: 16/207,463

(22) Filed: Dec. 3, 2018

(65) Prior Publication Data

US 2019/0186899 A1 Jun. 20, 2019

Related U.S. Application Data

(60) Provisional application No. 62/598,778, filed on Dec. 14, 2017.

(51) Int. Cl.
| | |
|---|---|
| *G01M 15/06* | (2006.01) |
| *G01B 11/14* | (2006.01) |
| *F01B 7/04* | (2006.01) |
| *F01B 31/12* | (2006.01) |
| *F02B 75/28* | (2006.01) |
| *F01B 7/02* | (2006.01) |

(52) U.S. Cl.
CPC ............... *G01B 11/14* (2013.01); *F01B 7/02* (2013.01); *F01B 7/04* (2013.01); *F01B 31/12* (2013.01); *F02B 75/28* (2013.01); *F05B 2270/804* (2013.01); *F05B 2270/821* (2013.01)

(58) Field of Classification Search
CPC .... F01B 7/02; F01B 7/04; F01B 31/12; F02B 75/28; F05B 2270/804; G01B 11/14; G01M 15/02; G01M 15/06
USPC ...................................... 73/114.26
See application file for complete search history.

(56) References Cited

U.S. PATENT DOCUMENTS

| | | | | |
|---|---|---|---|---|
| 4,216,747 A | * | 8/1980 | Noguchi ............... | F01B 7/14 123/430 |
| 4,661,695 A | * | 4/1987 | Mori ..................... | G01M 15/06 250/227.11 |
| 5,085,125 A | * | 2/1992 | Emo ..................... | F15B 13/044 137/625.65 |
| 5,744,705 A | * | 4/1998 | Derouen ............... | G01B 11/14 73/114.77 |
| 2010/0313642 A1 | * | 12/2010 | Vroege ................ | G01B 11/12 73/114.77 |
| 2012/0085302 A1 | * | 4/2012 | Cleeves ................ | F02D 15/00 123/55.2 |
| 2014/0149018 A1 | * | 5/2014 | Martin .................. | F02P 23/04 701/102 |
| 2014/0149019 A1 | * | 5/2014 | Martin .................. | F02D 41/009 701/103 |
| 2014/0149023 A1 | * | 5/2014 | Martin .................. | G01S 17/88 701/113 |

(Continued)

*Primary Examiner* — Eric S. McCall

(74) *Attorney, Agent, or Firm* — Faegre Drinker Biddle & Reath LLP

(57) ABSTRACT

An optical measurement device is disclosed and includes a body configured to be mounted to at least one piston cylinder, and a compression ratio determination unit operatively connected to the body to receive optical measurement data and compute a clearance between at least two opposed pistons disposed within the at least one piston cylinder.

13 Claims, 4 Drawing Sheets

(56) References Cited

U.S. PATENT DOCUMENTS

| | | | |
|---|---|---|---|
| 2014/0324324 A1* | 10/2014 | Martin | F02N 15/10 |
| | | | 701/113 |
| 2015/0198134 A1* | 7/2015 | Martin | F02P 23/04 |
| | | | 701/22 |
| 2015/0198135 A1* | 7/2015 | Martin | F02P 23/04 |
| | | | 701/22 |
| 2015/0198136 A1* | 7/2015 | Martin | G01S 17/88 |
| | | | 356/72 |
| 2016/0341104 A1* | 11/2016 | Redon | F02B 75/28 |
| 2017/0241332 A1* | 8/2017 | Warren | F01L 5/04 |
| 2019/0331553 A1* | 10/2019 | Glugla | F02D 41/009 |

* cited by examiner

SYSTEMS AND METHODS FOR MEASUREMENT OF PISTON-TO-PISTON CLEARANCES IN MULTI-CYLINDER OPPOSED PISTON ENGINES

RELATED APPLICATIONS

The present disclosure is related to and claims priority to U.S. Provisional Application No. 62/598,778, filed Dec. 14, 2017, entitled "SYSTEMS AND METHODS FOR MEASUREMENT OF PISTON-TO-PISTON CLEARANCES IN MULTI-CYLINDER OPPOSED PISTON ENGINES," the entire disclosure of which is hereby expressly incorporated herein by reference.

FIELD OF THE DISCLOSURE

The present disclosure relates generally to opposed piston engines, and more particularly, to measurement of piston-to-piston clearances in multi-cylinder opposed piston engines.

BACKGROUND

Multi-cylinder opposed piston engines include opposed pistons such that the opposed pistons move away from each other during combustion of an air and fuel mixture. Each cylinder includes associated intake ports which receive air via an intake manifold, and one or more fuel injectors that provide fuel to the cylinder. The combustion of the air and fuel mixture allows the cylinders to drive one or more crankshafts. As a result of the combustion, exhaust gases vacate each cylinder via exhaust ports coupled to an exhaust manifold.

Combustion engines, including multi-cylinder opposed piston engines, typically need to meet emissions standards to be allowed to operate in various environments. For example, combustion engines require accurate piston-to-piston clearances to produce an effective compression ratio, which is necessary for commercialized versions of opposed piston engines to meet the emissions standards. Maintaining the accurate piston-to-piston clearances during an engine assembly operation is important, and the measurement of the piston-to-piston clearances can be obtained after relevant engine components, such as crankshafts, bearings, connecting rods, pistons, and the like, have been assembled.

However, in multi-cylinder opposed piston engines, the piston-to-piston clearances vary significantly across the cylinders due to crankshaft bore and/or stroke variations. These cylinder-to-cylinder variations cause inaccurate compression ratios in the cylinders and thus provide unsatisfactory emission controls in the opposed piston engines. Accordingly, there are opportunities to improve a method and system of checking and ensuring proper measurement of piston-to-piston clearances in multi-cylinder opposed piston engines during the engine assembly operation.

SUMMARY

A first aspect of the present disclosure provides an optical measurement device including a body configured to be mounted to at least one piston cylinder in which a mixture of fuel and air is combusted to drive at least one crankshaft, and a compression ratio determination unit operatively connected to the body to receive optical measurement data and compute a clearance between at least two opposed pistons disposed within the at least one piston cylinder.

In one example, the optical measurement device includes a base and an elongated body. In a variation, the compression ratio determination unit is disposed in the base of the optical measurement device. In another variation, the base includes a beam projector and a beam receiver for measuring a distance between the at least two opposed pistons. In a further variation, the elongated body has a first end connected to the base and an opposite second end configured to be insertable at least partially into a bore of the at least one piston cylinder. In another variation, a reflective object is disposed near the second end of the elongated body and configured for redirecting a light beam received from the beam projector.

In another example, the compression ratio determination unit is configured to calculate a compression ratio of the at least one piston cylinder based on the clearance. In a variation, the compression ratio determination unit calculates the compression ratio based on a maximum trapped volume in the at least one piston cylinder and a minimum trapped volume in the at least one piston cylinder.

In yet another example, the compression ratio determination unit is configured to determine at least one combustion parameter based on the clearance. In a variation, the at least one combustion parameter includes a minimum trapped volume in the at least one piston cylinder. In another variation, the at least one combustion parameter includes a piston-to-piston clearance between the at least two opposed pistons.

A second aspect of the present disclosure provides an optical measurement device including a base having a beam projector configured to project a light beam, and a beam receiver configured to receive the light beam, and an elongated body having a first end connected to the base and an opposite second end. Also included in the device is a reflective object configured to redirect the light beam and disposed near the second end of the elongated body, such that the light beam is projected by the beam projector toward the reflective object and the redirected light beam is received by the beam receiver.

A third aspect of the present disclosure provides a method of measuring a distance between at least two components. The method includes inserting an optical measurement device into a cavity through a bore, performing rotational movement with the optical measurement device in a radial direction for selectively positioning the optical measurement device in the cavity, and calculating a distance between the at least two components based on the rotational movement of the optical measurement device inserted into the cavity.

In one example, the method further includes wherein rotating the optical measurement device comprises rotating the optical measurement device in either a clockwise direction or a counterclockwise direction relative to a longitudinal axis of the optical measurement device. In another example, the method further includes, before rotating the optical measurement device in the radial direction, selectively indexing at least one crankshaft by a predetermined rotational angle. In yet another example, the method further includes wherein indexing at least one crankshaft by the predetermined rotational angle comprises positioning the crankshaft at a first predetermined position. In still another example, the method further includes wherein indexing at least one crankshaft by the predetermined rotational angle comprises positioning the crankshaft at a second predetermined position that is different from the first predetermined position.

A fourth aspect of the present disclosure provides a method of measuring a distance between a first piston and an opposed second piston. The method includes inserting an optical measurement device into a bore of a cylinder, and performing first rotational movement with the optical measurement device in a radial direction for selectively positioning the optical measurement device in the cylinder to measure a first minimum distance between the optical measurement device and the first piston. Also, the method includes performing second rotational movement with the optical measurement device in the radial direction for selectively positioning the optical measurement device in the cylinder to measure a second minimum distance between the optical measurement device and the second piston, and calculating a total distance between the first piston and the second piston.

In one example, the method further includes wherein calculating the total distance between the first piston and the second piston comprises including at least one of: a compression ratio of the cylinder, a minimum trapped volume between the first piston and the second piston, and a piston-to-piston clearance between the first piston and the second piston.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements, wherein.

Figure 1:
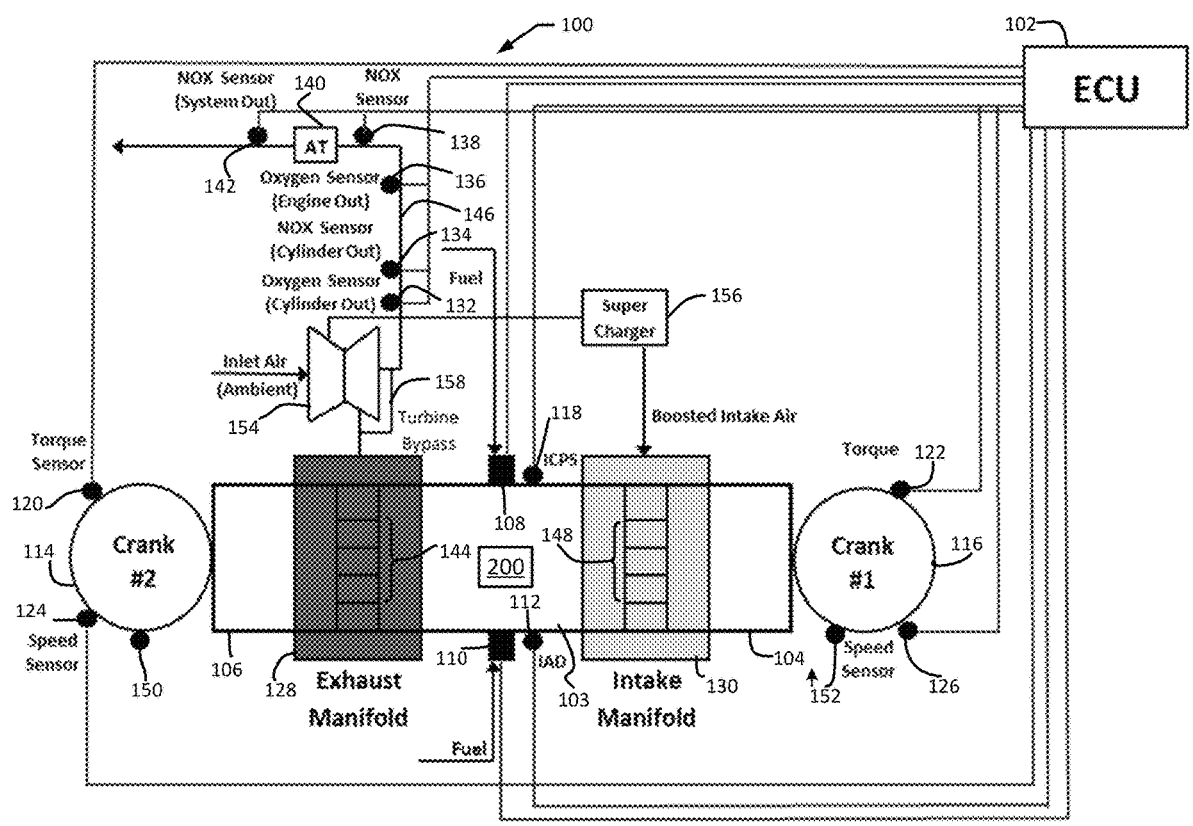
FIG. 1 is a block diagram of one illustrative embodiment of a multi-cylinder opposed piston engine having various sensors and an optical measurement device in accordance with an embodiment of the present disclosure.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF EMBODIMENTS

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 5:
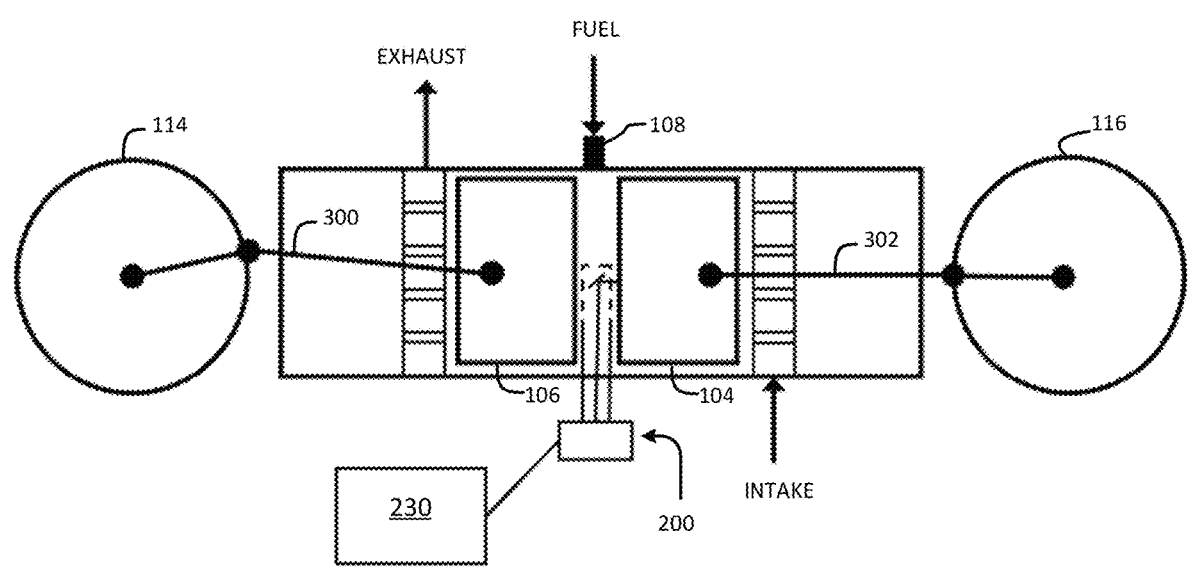
FIG. 5 is an illustrative multi-cylinder opposed piston engine of FIG. 1 having the optical measurement device of FIG. 2 in accordance with an embodiment of the present disclosure.

Referring to FIGS. 1 and 5, a block diagram is shown of one illustrative embodiment of a multi-cylinder opposed piston engine 100 including an engine control unit (ECU) 102 and cylinder 103 that includes opposed pistons 104, 106. As shown in greater detail in FIG. 2, an optical measurement device 200 is removably connected to cylinder 103 to provide clearance information between opposed pistons 104 and 106. ECU 102 can include one or more processors, such as a central processing unit (CPU), microcontrollers, processing cores, or any other suitable processing devices executing suitable instructions. In some examples, ECU 102 can include one or more field programmable gate arrays (FPGA), integrated circuits (IC) such as application-specific integrated circuits (ASIC), and any other suitable logic. Although only one cylinder 103 is shown, multi-cylinder opposed piston engine 100 can include multiple cylinders as is recognized in the art. Cylinder 103 includes fuel injectors 108, 110, ignition assist device (IAD) 112, and internal cylinder pressure sensor (ICPS) 118. The ECU 102 is in communication with fuel injectors 108, 110, IAD 112 and ICPS 118.

Cylinder's 103 opposed pistons 104, 106 are associated with crankshafts 116, 114, respectively. As shown in FIG. 5, for example, crankshaft 114 is operatively connected to piston 106 via a first connecting rod 300, and another crankshaft 116 is operatively connected to opposed piston 104 via a second connecting rod 302. In use, during combustion of an air and fuel mixture, opposed piston 106 drives crankshaft 114, while opposed piston 104 drives crankshaft 116. Crankshaft 114 may be considered an exhaust-side crankshaft as it is closest to exhaust manifold 128. Similarly, crankshaft 116 may be considered an intake-side crankshaft, as it is closest to intake manifold 130. As illustrated, crankshaft 114 includes torque sensor 120 and crankshaft 116 includes torque sensor 122. Additionally, crankshaft 114 includes speed sensor 124 and crankshaft 116 includes speed sensor 126. ECU 102 is in communication with the torque sensors 120, 122 and the speed sensors 124, 126. ECU 102 can receive data (e.g., measurements) from torque sensors 120, 122, such as crankshaft torque data. Similarly, ECU 102 can receive data from speed sensors 124, 126, such as crankshaft speed data. In some embodiments, crankshaft 114 includes NVH sensor 150 and crankshaft 116 includes NVH sensor 152. ECU 102 is in communication with the NVH sensors 150, 152, and can receive data (e.g., measurements) from NVH sensors 150, 152, such as noise, vibration, and harshness data.

In the illustrated embodiment, cylinder 103 is operably coupled to exhaust manifold 128 and to intake manifold 130. For example, cylinder 103 can receive air via intake ports 148 coupled to intake manifold 130 to mix with fuel received via fuel injectors 108, 110 for combustion. Exhaust gases can be released from cylinder 103 during or after combustion via one or more exhaust ports 144 operatively coupled to exhaust manifold 128. As the exhaust gases leave exhaust ports 144, they enter exhaust passageway 146.

In one example, ambient intake air is provided to intake manifold 130 via intake ports 148 using a first compressor 154, such as a turbocharger and a second compressor 156, such as a supercharger. In another example, a turbine bypass 158 is provided for bypassing first compressor 154, as desired. Other suitable combinations and configurations of compressors and relevant components are also contemplated to suit different applications.

In other exemplary system architectures, multi-cylinder opposed piston engine 100 includes real-time torque sensors on at least one of the two crankshafts, oxygen (lambda) sensors in the exhaust port of each individual cylinder and/or in a common exhaust gas collector downstream of all cylinders, NOx sensors in the exhaust port of each individual cylinder, NOx sensors in the exhaust path upstream and/or downstream of aftertreatment (AT) device(s), In-Cylinder Pressure (ICPS) sensors in one or more of the combustion cylinders, and Ignition Assist Device (IAD) in each of the combustion cylinders. In other embodiments, Ignition Assist Devices (IAD) includes electrical spark plug(s), glow plug(s), laser ignition, or plasma ignition types. In some embodiments, engine 100 utilizes diesel micro-pilot ignition in lieu of Ignition Assist Device (IAD).

In this illustrative embodiment, oxygen sensor 132 and NOx sensor 134 are located in the exhaust passageway 146 of cylinder 103. As such, oxygen sensor 132 and NOx sensor 134 can monitor the exhaust gases as they leave cylinder 103 via the exhaust passageway 146 of cylinder 103. Oxygen sensor 132 and NOx sensor 134 are in communication with ECU 102. ECU 102 can receive data (e.g., measurements) from oxygen sensor 132 such as data including exhaust gas oxygen level data. Similarly, ECU 102 can receive data (e.g., measurements) from NOx sensor 134 such as data including exhaust gas NOx level data.

Additionally, oxygen sensor 136 is located in a common exhaust gas collector of the exhaust manifold 128, which may be downstream of the exhaust passageway 146 of cylinder 103. For example, assuming multiple cylinders, the common exhaust gas collector may receive exhaust gases from one or more cylinders. As such, oxygen sensor 136 is located such that it can monitor gases received from one or more cylinders. Similarly, NOx sensor 138 is located in a common exhaust gas collector of the exhaust manifold 128. Assuming multiple cylinders, NOx sensor 138 can monitor gases received from one or more cylinders. As illustrated, oxygen sensor 136 and NOx sensor 138 are located upstream of after treatment device 140, and thus can monitor exhaust gases before the exhaust gases are treated by after treatment device 140. Each of oxygen sensor 136 and NOx sensor 138 are in communication with ECU 102. ECU 102 can receive data from oxygen sensor 136 and NOx sensor 138

As illustrated, NOx sensor 142 is located downstream of after treatment device 140. ECU 102 is in communication with NOx sensor 142 and can receive data from NOx sensor 142. Although not illustrated, additional sensors, such as oxygen sensors, can be located downstream of after treatment device 140.

Figure 2:
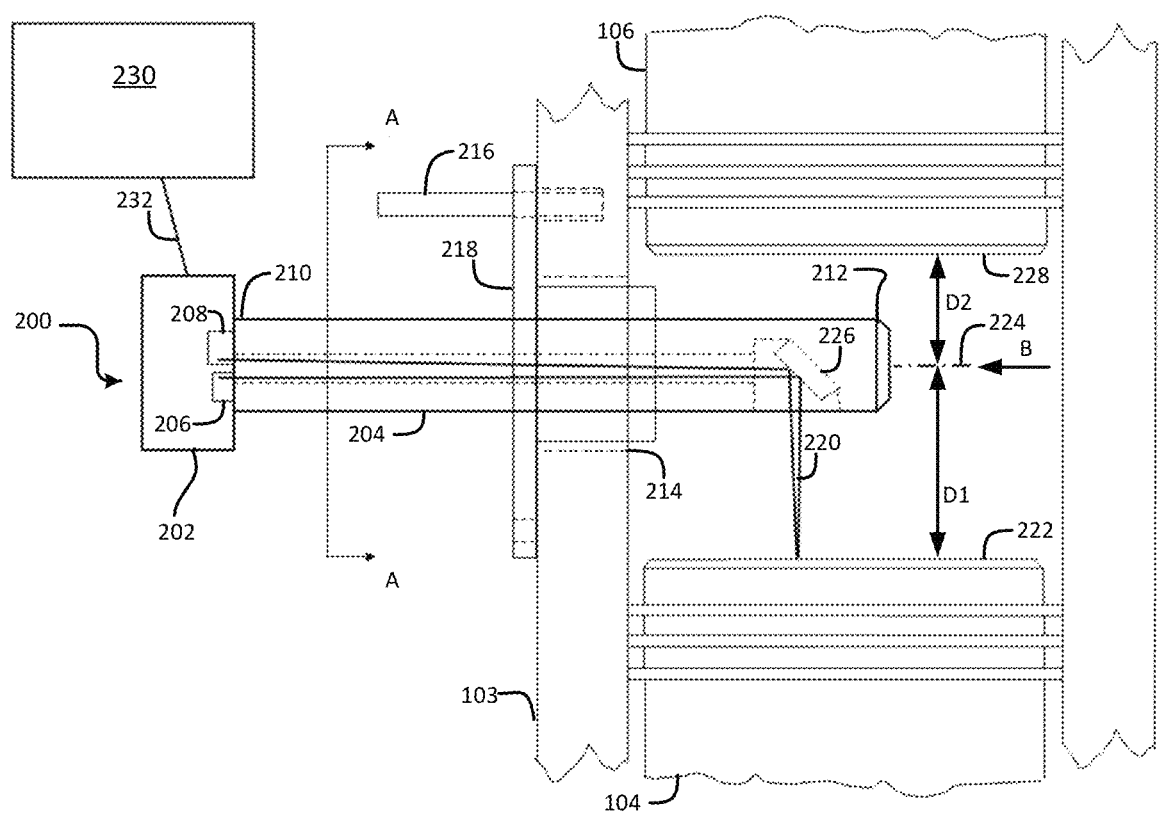
FIG. 2 is a schematic view of one illustrative embodiment of the optical measurement device of FIG. 1 in accordance with an embodiment of the present disclosure.
Figure 3:
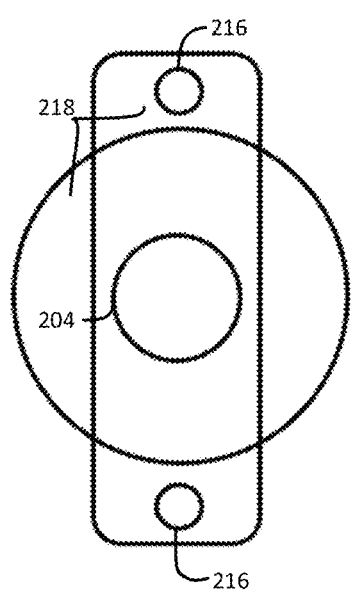
FIG. 3 is an enlarged schematic, cross-sectional view of the optical measurement device of FIG. 2 taken along line A-A in accordance with an embodiment of the present disclosure.

Referring to FIG. 2, an illustrative optical measurement device, generally designated 200, is shown and configured to provide clearance information between opposed pistons 104 and 106. In one embodiment, optical measurement device 200 includes a base 202 and an elongated body 204. For example, elongated body 204 is a hollow tube having a predetermined diameter, but other configurations are contemplated. In this example, base 202 includes a beam projector 206 and a beam receiver 208, and elongated body 204 has a first end 210 connected to base 202 and an opposite second end 212 inserted at least partially into a bore 214 of cylinder 103. For example, bore 214 can be a fuel injector mounting bore on a cylinder block, but other suitable apertures accommodating insertion of optical measurement device 200 into cylinder 103 are also contemplated to suit different applications. In embodiments, optical measurement device 200 is mounted to cylinder 103. In one example, attachment of optical measurement device 200 to cylinder 103 is achieved by one or more fasteners 216 and a mounting fixture 218. Other suitable attachment methods are also contemplated to suit the application.

Referring now to FIGS. 2-5, optical measurement device 200 is configured to provide clearance information based on a distance between opposed pistons 104 and 106 in cylinder 103. Initially, before measuring the distance, each crankshaft 114, 116 of multi-cylinder opposed piston engine 100 is placed in a predetermined crankshaft position to obtain accurate clearance information. For example, each crankshaft 114, 116 is rotated to a first predetermined position corresponding to a combustion top-dead-center position of a corresponding piston 104 or 106. As another example, each crankshaft 114, 116 is rotated to a second predetermined position corresponding to a near-combustion position (e.g., 5 degrees away from the top-dead-center position) of a corresponding piston 104 or 106. As such, each crankshaft 114, 116 is selectively indexed or positioned by a predetermined rotational angle based on at least one of: the first predetermined position and the second predetermined position, as desired. Other suitable rotational arrangements of crankshafts 114, 116 are also contemplated to suit different applications.

In one embodiment, beam projector 206 is configured to project a light beam 220 within a predetermined wave band, and beam receiver 208 is configured to measure a first in-cylinder distance D1 between an outer surface 222 of a first piston 104 of cylinder 103 and a longitudinal axis 224 of elongated body 204 of optical measurement device 200. For example, light beam 220 is projected by beam projector 206 toward a reflective object 226, such as a mirror, disposed near second end 212 of elongated body 204. Exemplary reflective objects 226 include flat or convex mirrors, but other configurations are also contemplated. Exemplary beam projectors 206 include white light interferometers and laser displacement gages, but other suitable devices are also contemplated.

Figure 4:
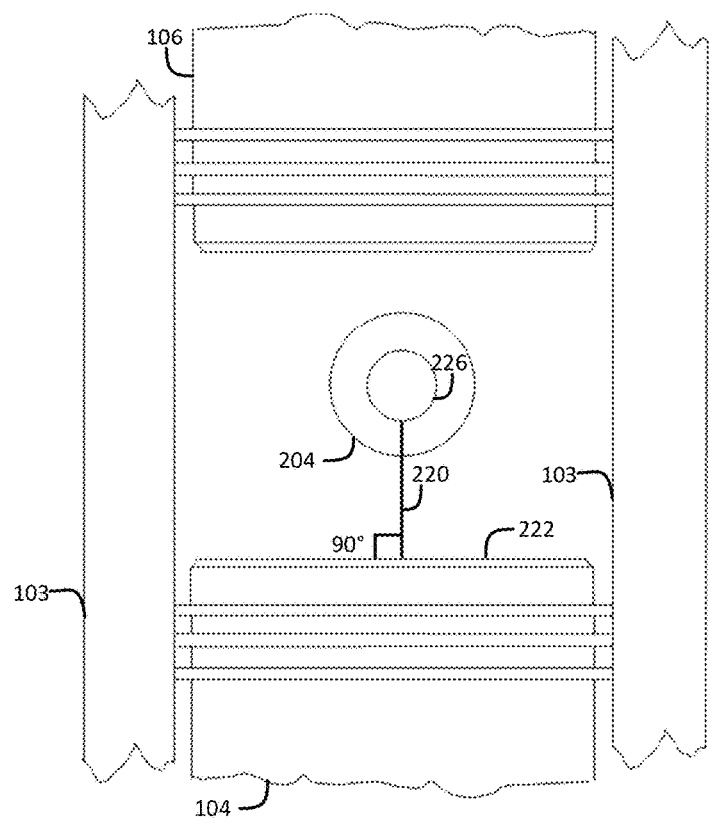
FIG. 4 is an enlarged schematic side view of the optical measurement device of FIG. 2 shown in a direction generally indicated with an arrow B.

Reflective object 226 is configured to redirect a light beam 220 received from beam projector 206 in such a direction that light beam 220 is perpendicularly directed toward the outer surface 222 of first piston 104. For example, as shown in FIG. 4, light beam 220 is redirected in a right-angle (90 degrees) direction relative to top outer surface 222 of first piston 104 to measure the in-cylinder distance D1. In one embodiment, optical measurement device 200 is variably rotatable to adjust a radial position of elongated body 204 so that the right-angle direction of light beam 220 generated by reflective object 226 is achieved. Light beam 220 reflected by the outer surface 222 of first piston 104 is received by reflective object 226 and redirected to beam receiver 208 for subsequent transmission of the clearance information representing the in-cylinder distance D1.

Next, optical measurement device 200 is selectively rotated so that reflective object 226 is facing toward a second piston 106 of cylinder 103. A second in-cylinder distance D2 between an outer surface 228 of second piston 106 and the longitudinal axis 224 of elongated body 204 of optical measurement device 200 is measured in a similar way described above. In embodiments, the clearance information between opposed pistons 104 and 106 in cylinder 103 is determined based on at least one of first distance D1 and second distance D2. In one example, the clearance information includes either first distance D1 or second distance D2. For example, first distance D1 and second distance D2 can have an identical length. In another example, the clearance information includes both first and second distances D1 and D2.

In one embodiment, beam receiver 208 is configured to transmit the clearance information including first distance D1 and second distance D2 to a compression ratio determination unit 230 operatively coupled to optical measurement device 200 via a bus 232. Compression ratio determination unit 230 can include one or more processors, such as a CPU, microcontrollers, processing cores, or any other suitable processing devices executing suitable instructions. In some examples, compression ratio determination unit 230 can include one or more field programmable gate arrays (FPGA), integrated circuits (IC) such as application-specific integrated circuits (ASIC), and any other suitable logic. Further, although compression ratio determination unit 230 is shown separately from optical measurement device 200, it is also contemplated that compression ratio determination unit 230 can be disposed in base 202 of optical measurement device 200 to suit different applications. Other suitable configurations are contemplated.

Compression ratio determination unit 230 is configured to calculate a compression ratio of cylinder 103 based on the clearance information to determine whether multi-cylinder opposed piston engine 100 meets the emissions standards. For example, compression ratio determination unit 230 receives the clearance information having first distance D1 and second distance D2, both of which are received from beam receiver 208 of optical measurement device 200. Then, compression ratio determination unit 230 calculates the compression ratio of cylinder 103 based on a maximum trapped volume in cylinder 103 and a minimum trapped volume in cylinder 103.

In this example, the maximum trapped volume is defined as a volume between opposed pistons 104 and 106 in cylinder 103 when both pistons 104, 106 are spaced apart at a maximum distance from each other for operation. For example, the cylinder volume between opposed pistons 104, 106 is the greatest when a compression ring of piston 104, 106 is just above exhaust port 144. In another example, the minimum trapped volume is defined as a volume between opposed pistons 104 and 106 in cylinder 103 when both pistons 104, 106 are spaced apart at a minimum distance from each other for operation. For example, the cylinder volume between opposed pistons 104, 106 is the smallest when both pistons 104, 104 are at their closest point to each other in an engine operating cycle (e.g., at the combustion top-dead-center position for either an exhaust or intake piston).

An exemplary compression ratio $COMP_{RATIO}$ can be defined by a function of a maximum trapped volume and a minimum trapped volume, as provided by expression (1):

$$COMP_{RATIO} = F(Vol_{Max\_Trapped}, Vol_{Min\_Trapped}) \quad (1)$$

which can also be defined by expression (2):

$$COMP_{RATIO} = \pi r^2 * \frac{(D1_{MAX} + D2_{MAX})}{(D1_{MIN} + D2_{MIN})} \quad (2)$$

wherein $Vol_{Max\_Trapped}$ denotes a maximum trapped volume and $Vol_{Min\_Trapped}$ denotes a minimum trapped volume, $\pi$ denotes a Pi mathematical constant value, and r denotes a radius of cylinder bore in cylinder 103.

Further, $D1_{MAX}$ denotes a distance between a longitudinal axis 224 of elongated body 204 and a top surface 222 of first piston 104 at a location of maximum trapped volume. $D2_{MAX}$ denotes a distance between a longitudinal axis 224 of elongated body 204 and a top surface 228 of second piston 106 at a location of maximum trapped volume. Similarly, $D1_{MIN}$ denotes a distance between a longitudinal axis 224 of elongated body 204 and a top surface 222 of first piston 104 at a location of minimum trapped volume. $D2_{MIN}$ denotes a distance between a longitudinal axis 224 of elongated body 204 and a top surface 228 of second piston 106 at a location of minimum trapped volume. All distance values, $D1_{MAX}$, $D2_{MAX}$, $D1_{MIN}$, $D2_{MIN}$ are measured by optical measurement device 200 and transmitted to compression ratio determination unit 230 for further processing as described above.

Moreover, compression ratio determination unit 230 is configured to determine at least one combustion parameter based on the clearance information. For example, as described above, the combustion parameter includes the compression ratio $COMP_{RATIO}$ determined as a function of a maximum trapped volume and a minimum trapped volume. In another example, the combustion parameter includes the minimum trapped volume. An exemplary minimum trapped volume $VOL_{SQUEEZE}$ can be defined by expression (3):

$$VOL_{SQUEEZE} = \pi r^2 * (D1_{MIN} + D2_{MIN}) \quad (3).$$

In yet another example, the combustion parameter includes a piston-to-piston clearance between first piston 104 and second piston 106. An exemplary piston-to-piston clearance $CLR_{PISTONS}$ can be defined by expression (4):

$$CLR_{PISTONS} = D1_{MIN} + D2_{MIN} \quad (4).$$

Embodiments of the present disclosure are described above by way of example only, with reference to the accompanying drawings. Further, the previous description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. An optical measurement device, comprising:
a body configured to be mounted to a piston cylinder; and
a compression ratio determination unit operatively connected to the body to receive optical measurement data and compute a clearance between at least two opposed pistons disposed within the piston cylinder.

2. The device of claim 1, wherein the optical measurement device includes a base and an elongated body.

3. The device of claim 2, wherein the compression ratio determination unit is disposed in the base of the optical measurement device.

4. The device of claim 2, wherein the base includes a beam projector and a beam receiver for measuring a distance between the two opposed pistons.

5. The device of claim 4, wherein the elongated body has a first end connected to the base and an opposite second end configured to be insertable at least partially into a bore of the piston cylinder.

6. The device of claim 5, wherein a reflective object is disposed near the second end of the elongated body and configured for redirecting a light beam received from the beam projector.

7. The device of claim 1, wherein the compression ratio determination unit is configured to calculate a compression ratio of the at least one piston cylinder based on the clearance.

8. The device of claim 7, wherein the compression ratio determination unit calculates the compression ratio based on a maximum trapped volume in the piston cylinder and a minimum trapped volume in the piston cylinder.

9. The device of claim 1, wherein the compression ratio determination unit is configured to determine at least one combustion parameter based on the clearance.

10. The device of claim 9, wherein the at least one combustion parameter includes a minimum trapped volume in the piston cylinder.

11. The device of claim 9, wherein the at least one combustion parameter includes a piston-to-piston clearance between the two opposed pistons.

12. A method of measuring a distance between a first piston and an opposed second piston, comprising:
inserting an optical measurement device into a bore of a cylinder;
performing a first rotational movement with the optical measurement device in a radial direction for selectively positioning the optical measurement device in the cylinder to measure a first minimum distance between the optical measurement device and the first piston;
performing a second rotational movement with the optical measurement device in the radial direction for selectively positioning the optical measurement device in the cylinder to measure a second minimum distance between the optical measurement device and the second piston; and
calculating a total distance between the first piston and the second piston.

13. The method of claim 12, wherein calculating the total distance between the first piston and the second piston comprises including at least one of: a compression ratio of the cylinder, a minimum trapped volume between the first piston and the second piston, and a piston-to-piston clearance between the first piston and the second piston.

* * * * *